United States Patent [19]

Serizawa et al.

[11] Patent Number: 5,097,482
[45] Date of Patent: Mar. 17, 1992

[54] METHOD AND APPARATUS OF DECISION FEEDBACK EQUALIZATION FOR MULTIPATH DIGITAL COMMUNICATION

[75] Inventors: Mutsuma Serizawa, Tokyo; Koji Ogura; Katsumi Sakakibara, both of Kanagawa, all of Japan

[73] Assignee: Kabushiki Kaisha Toshiba, Kawasaki, Japan

[21] Appl. No.: 612,079

[22] Filed: Nov. 13, 1990

[30] Foreign Application Priority Data

Nov. 13, 1989 [JP] Japan .................... 1-292235

[51] Int. Cl.⁵ .................................... H03H 7/30
[52] U.S. Cl. ........................ 375/12; 375/14; 333/18; 333/28 R; 364/724.2
[58] Field of Search ............... 375/12, 13, 14; 333/18, 333/28 R; 364/724.2

[56] References Cited

U.S. PATENT DOCUMENTS

| 4,213,095 | 7/1980 | Falconer | 375/14 |
| 4,821,289 | 4/1989 | Peile | 375/14 |
| 4,985,902 | 1/1991 | Gurcan | 375/14 |

Primary Examiner—Benedict V. Safourek
Assistant Examiner—Young Tse
Attorney, Agent, or Firm—Foley & Lardner

[57] ABSTRACT

A method of an apparatus for decision feedback equalization, capable of dealing with time reversal for the transmission characteristic arising in a course of equalization. Without a considerable increase of the number of taps used and the resulting reduction of the response speed. In this apparatus, a number of feedforward taps for providing a forward part and a number of feedback taps for providing a feedback part are controlled according to whether the transmission signal is to be read in a normal time direction or in a reversed time direction; the forward part and the feedback part are added; and the digital transmission signal is reconstructed according to a result of the addition.

14 Claims, 10 Drawing Sheets

METHOD AND APPARATUS OF DECISION FEEDBACK EQUALIZATION FOR MULTIPATH DIGITAL COMMUNICATION

BACKGROUND OF THE INVENTION

1. Field of the Invention

The present invention relates to a technique of decision feedback equalization mainly utilized in a field of digital mobile communication.

2. Description of the Background Art

Recently, there has been progress toward successful application of digital communication techniques to various communication modes to be utilized on a moving object such as an automobile, a ship, or an airplane, which includes mobile communication with a fixed communication station or a communication satellite, TV broadcast reception, radio broadcast reception, or mobile communication for self-position tracking. Among the digital communication techniques utilized for this purpose, one of the most popular techniques is a so-called "Time Division Multiple Access" (abbreviated hereafter as TDMA) technique.

The TDMA technique is a technique for realizing a communication mode in which a plurality of stations transmit signals to a single relay station at the same passband, without timewise overlapping. In this technique, a prescribed constant period of time called a TDMA frame is established, and communication is performed within an allocated time slot in this TDMA frame. Thus, each station transmits bursty signals into the allocated time slot in the TDMA frame, under burst synchronization control to avoid interferences with the signals from other stations.

This type of communication system, which utilizes a radio transmission, usually involves a multipath, i.e., a multiple number of paths through which the radio signals can be transmitted between a transmitting station and a receiving station. The presence of the multipath creates a problem of severe multipath distortion on the signals.

Figure 1:
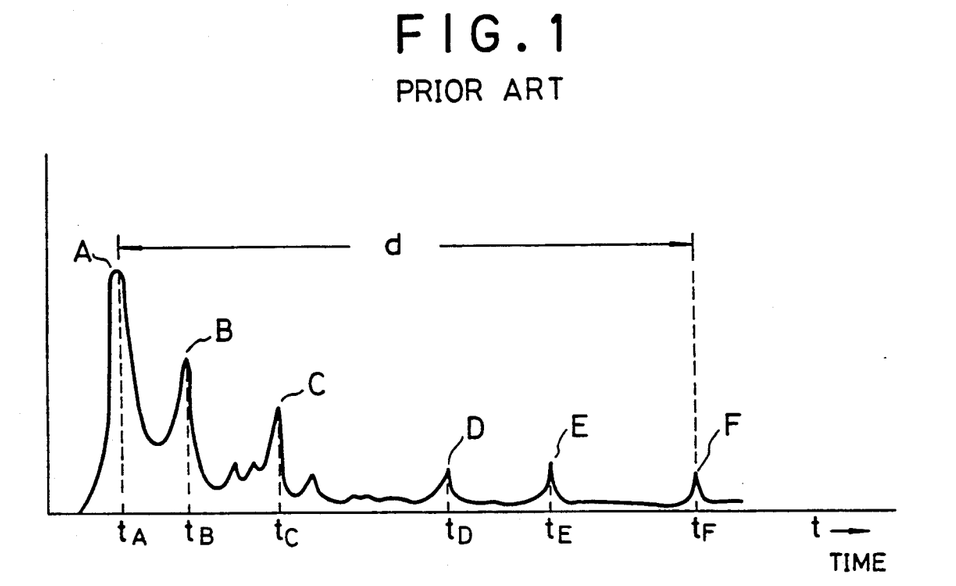
FIG. 1 is a graph of a transmission characteristic for a minimum phase mode.
Figure 2:
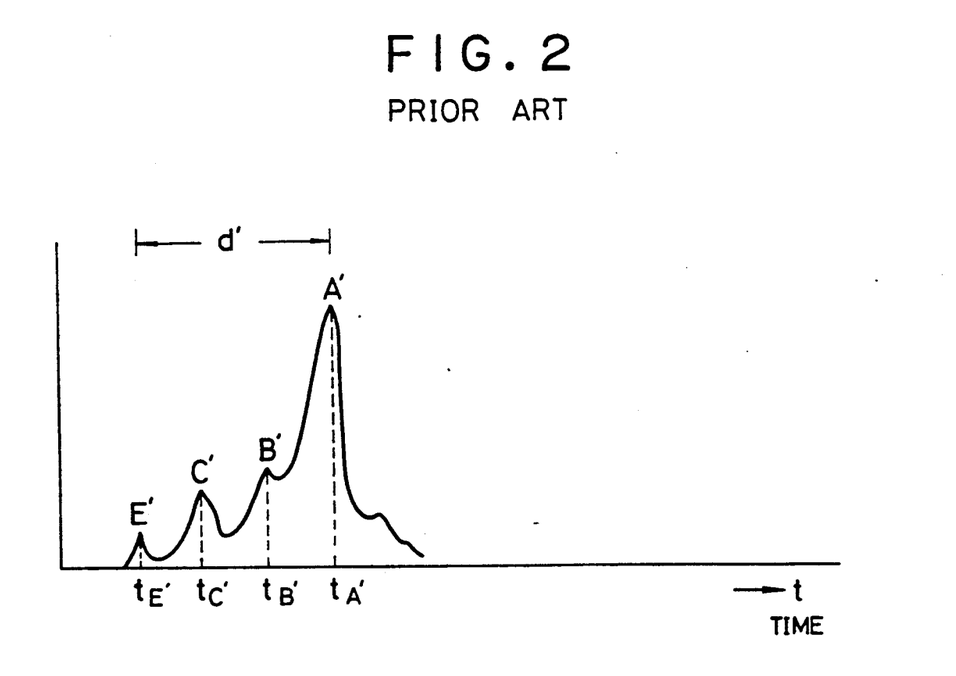
FIG. 2 is a graph of a transmission characteristic for a non-minimum phase mode.

In general, in a radio transmission involving the multipath, the transmission characteristic most often becomes as shown in FIG. 1 in which amplitude decreases as time elapses, which is a type of impulse response called a minimum phase mode, and where number of peaks shows the multipath reflections. On the other hand, there is another type of impulse response called a non-minimum phase mode in which amplitude increases as time elapses as shown in FIG. 2, although this mode appears far less frequently than the minimum phase mode does. It is known that the transmission characteristics of the minimum phase mode and the non-minimum phase mode are continually changing. Also, it is known that an average value $E(d)$ of a delay spread d for the minimum phase mode and an average value $E(d')$ of a delay spread $d'$ for the non-minimum phase mode generally satisfy a relationship $E(d) > E(d')$.

In order to cope with the problem of distortion due to multipath transmission, a so-called decision feedback equalizer is utilized.

Figure 3:
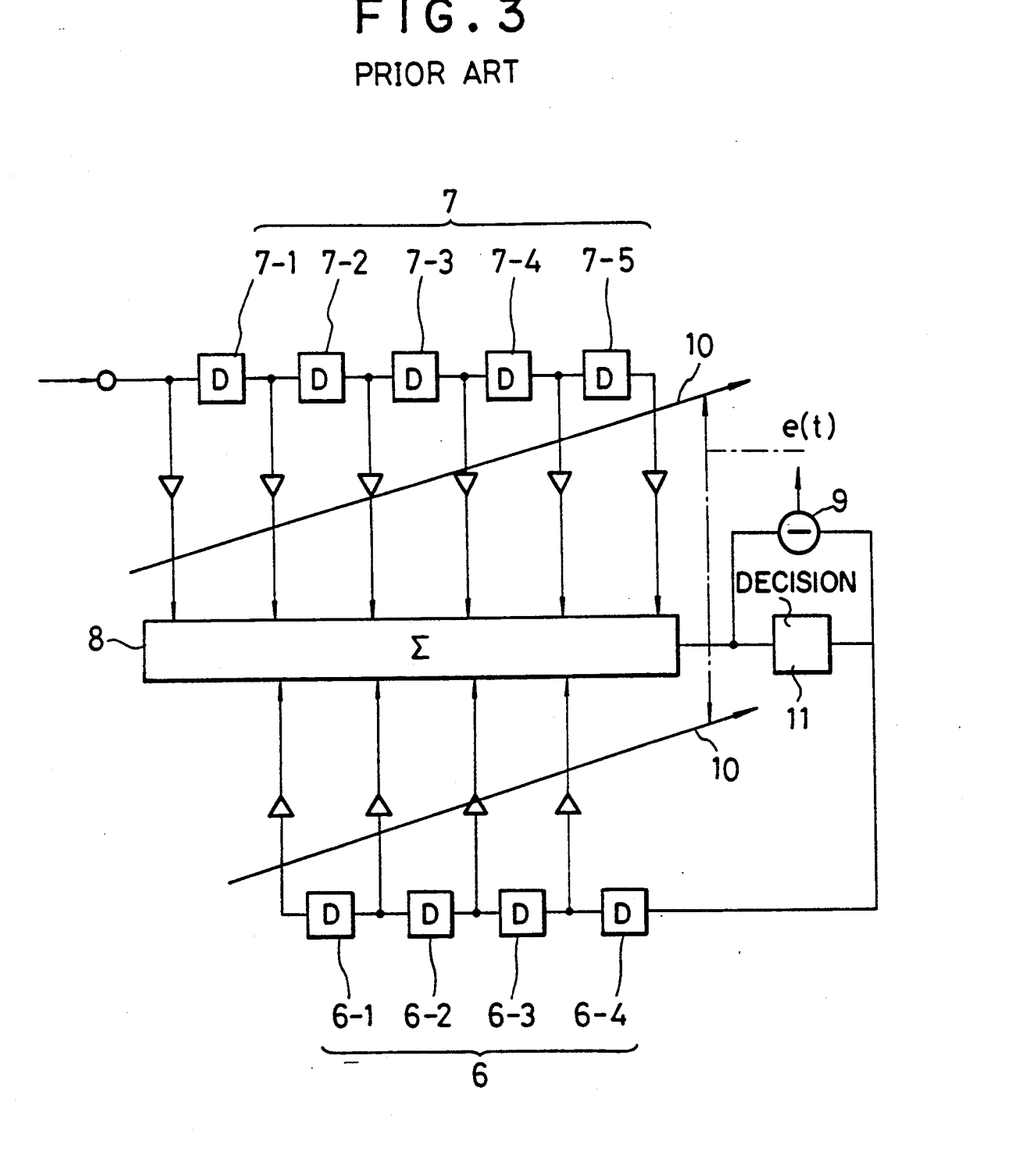
FIG. 3 is a schematic block diagram of a conventional decision feedback equalizer.

An example of a conventional decision feedback equalizer is shown in FIG. 3.

This decision feedback equalizer comprises a plurality of feedback taps 6 (6-1, 6-2, 6-3, and 6-4), a plurality of feedforward taps 7 (7-1, 7-2, 7-3, 7-4, and 7-5), an adder 8, a substractor 9 and a decision device 11. The feedforward taps 7 provide a forward part of the equalizer while the feedback taps 6 provide a feedback part of the equalizer, the signals from which are added together by the adder 8 to reconstruct the transmitted signal without the multipath distortion. The decision device 11 determines the binary values of the transmitted signal, i.e., which portion is 0 and which portion is 1 in the transmitted signal, according to the output of the adder 8. The output of the decision device 11 is fed back to the feedback taps 6. Meanwhile, the substractor 9 subtracts the output of the adder 8 from the output of the decision device 11 to obtain a difference signal $e(t)$, so as to assess the appropriateness of tap coefficients given to the feedforward taps 7 and the feedback taps 6. The tap coefficient of each of the feedforward taps 7 and the feedback taps 6 are adjusted according to this difference signal $e(t)$, as indicated by arrows 10. Further detailed description of the decision feedback equalizer can be found in "Adaptive Equalization", S. U. H. Qureshi, Proceeding of the IEEE, Vol. 73, No. 9, pp. 1349-1987, September, 1985.

The multipath distortion shown in FIGS. 1 and 2 can be removed by this decision feedback equalizer of FIG. 3 as follows.

In the case of the minimum phase mode of FIG. 1, the feedback taps 6 play a dominant role. In this case, by using the decision result for the multipath reflection peak at a time $t=t_A$ in FIG. 1, the multipath reflection peaks arriving at later times $t=t_B$, $t=t_C$, $t=t_D$, $t=t_E$, and $t=t_F$ are cancelled out.

On the other hand, in the case of the non-minimum phase mode of FIG. 2, the feedforward taps 7 play a dominant role. In this case, the signals received at the time $t=t_C$, $t=t_B$, and $t=t_{A'}$ are linearly synthesized to cancel out the multipath components, before making a decision for the signal at the time $t=t_E$, and then the decision is made for the time $t=t_{A'}$.

In general, the equalization of the non-minimum phase mode requires a considerably greater number of taps than the equalization of the minimum phase mode does. This is particularly true in a case in which the signals received at the time $t=t_{A'}$ and $t=t_{B'}$ (or at the time $t=t_C$, or else at the time $t=t_E$) have almost the same amplitude.

Thus, the conventional decision feedback equalizer requires a sufficient number of feedback taps to equalize the minimum phase mode, and a sufficient number of feedforward taps to equalize the non-minimum phase mode. Also, in order to satisfy the relationship $E(d) > E(d')$, a considerable number of feedback taps has been required.

However, the increase of the number of feedback and feedforward taps considerably reduces the response speed of the equalizer with respect to the change of the transmission medium distortion, so that it has been impossible to utilize such an equalizer with many taps in mobile communication in which the transmission characteristic varies very rapidly.

Figure 4:
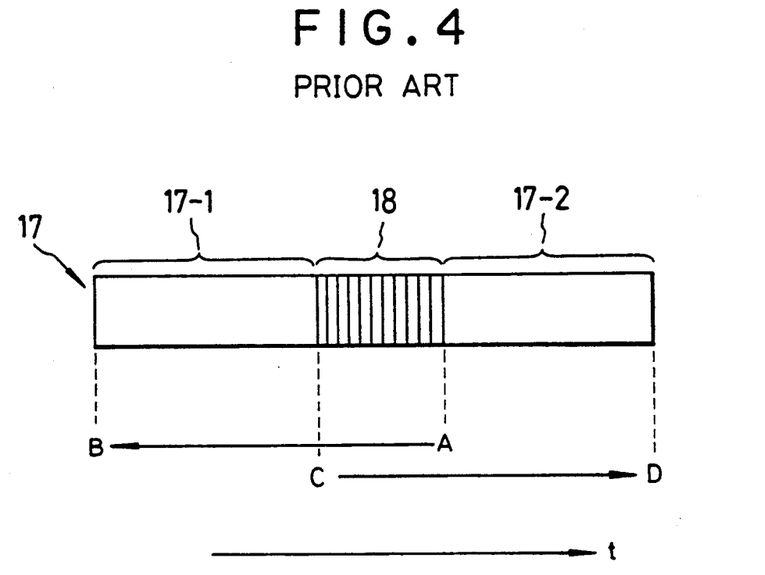
FIG. 4 is a diagram of an example of bursty signal data to be equalized.

Now, as shown in FIG. 4, in the TDMA technique, a training signal 18 is provided in a middle of bursty signal data 17, where the training signal 18 is sandwiched between the first transmission data 17-1 and the second transmission data 17-2. This position of the training signal 18 is used in order to secure a similar transmission characteristic at a time of transmission data reception and at a time of training signal reception.

In equalizing such a bursty signal data 17, the received signals are temporarily stored in a memory device first. Then, in order to obtain the second transmission data 17-2, the data are equalized as they are read out, starting from C toward D (in a normal time direction), from the memory device. On the other hand, in order to obtain the first transmission data 17-1, the data are equalized as they are read out, starting from A toward B (in a reversed time direction), from the memory device. Thus, the training signal 18 is indispensable in equalizing the received signals.

However, the equalization of such bursty signal data by the decision feedback equalizer has the following problem.

Figure 5:
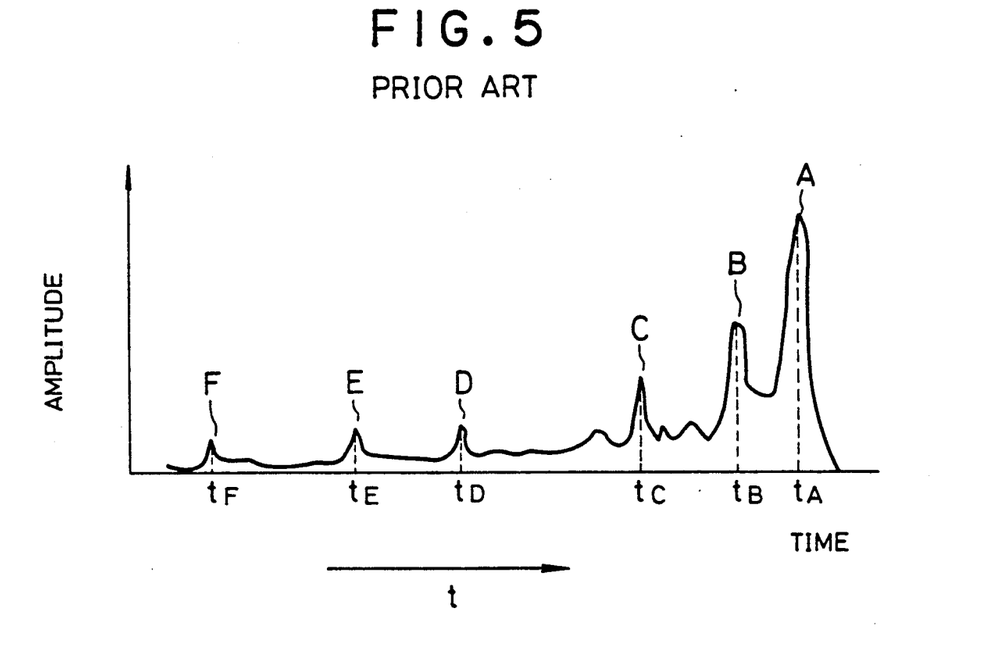
FIG. 5 is a graph of a transmission characteristic for a minimum phase mode as it appears in a reversed time direction.
Figure 6:
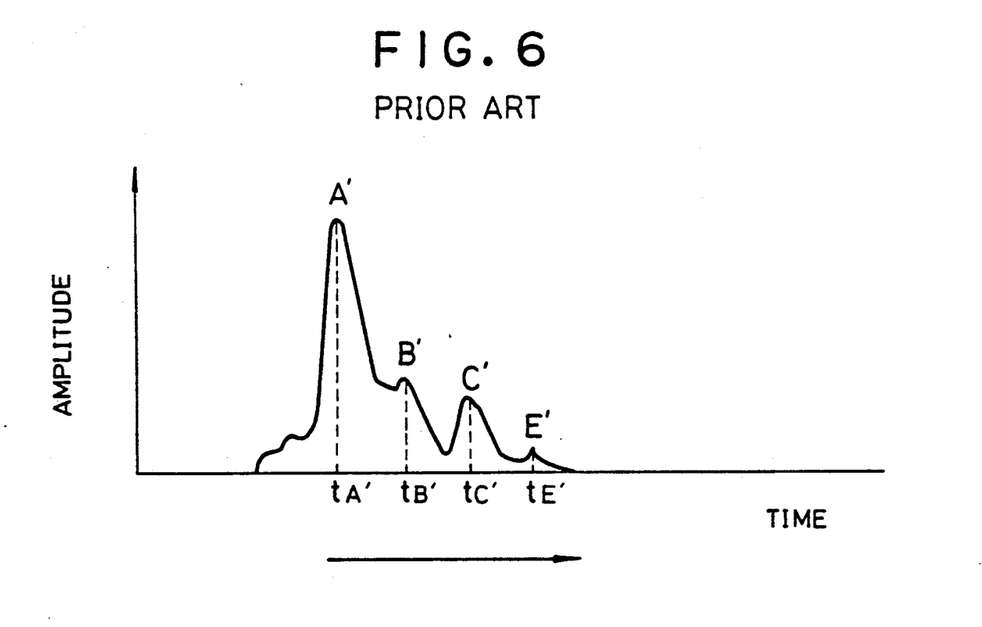
FIG. 6 is a graph of a transmission characteristic for a non-minimum phase mode as it appears in a reversed time direction.

Namely, in equalizing the data starting from A toward B, the direction of time appears to be reversed, so that instead of dealing with the transmission characteristics of FIGS. 1 and 2, the equalizer has to deal with the mirror-image transmission characteristics of FIGS. 5 and 6. Thus, when the equalizer is designed to have only a sufficient number of a predetermined number of feedforward and feedback taps to deal with the transmission characteristics of FIGS. 1 and 2, it is not capable of dealing with the transmission characteristics of FIGS. 5 and 6.

Figure 7:
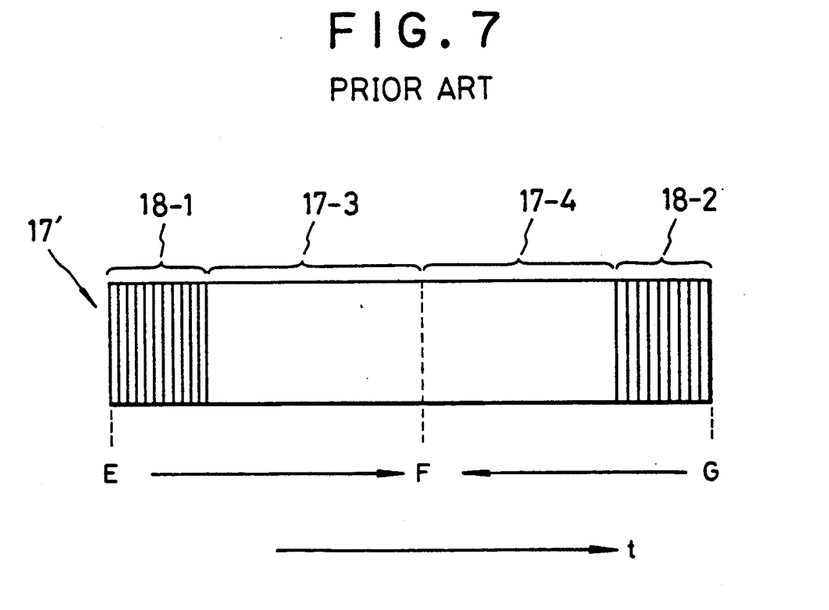
FIG. 7 is a diagram of another example of bursty signal data to be equalized.

Similarly, as shown in FIG. 7, the training signals 18-1 and 18-2 can be provided at ends of the bursty signal data 17', where the first transmission data 17-3 and the second transmission data 17-4 are sandwiched between the first training signal 18-1 and the second training signal 18-2.

In equalizing such bursty signal data 17', the received signals are temporarily stored in a memory device first as before. Then, in order to obtain the first transmission data 17-3, the data are equalized as they are read out, starting from E toward F (in a normal time direction), whereas in order to obtain the second transmission data 17-4, the data are equalized as they are read out, starting from G toward F (in a reversed time direction), from the memory device.

Here, again, in equalizing the data starting from G toward F, the direction of time appears to be reversed, and the same problem as described above occurs for this case as well.

SUMMARY OF THE INVENTION

It is therefore an object of the present invention to provide a method an apparatus far decision feedback equalization, capable of dealing with the time reversal for the transmission characteristic arising in the course of equalization, without a considerable increase in the number of taps used and a resulting reduction of the response speed.

According to one aspect of the present invention there is provided an apparatus for decision feedback equalization of a digital transmission signal, comprising: a variable number of feedforward taps for providing a forward part; a variable number of feedback taps for providing a feedback part; means for controlling the number of feedforward taps and a number of feedback taps according to whether the transmission signal is to be read in a normal time direction or in a reversed time direction; an adder for adding the forward part and the feedback part; and a decision device for reconstructing the digital transmission signal according to an output of the adder.

According to another aspect of the present invention there is provided a method of decision feedback equalization of a digital transmission signal, comprising the steps of: controlling a number of feedforward taps for providing a forward part and a number of feedback taps for providing a feedback part, according to whether the transmission signal is to be read in a normal time direction or in a reversed time direction; adding the forward part and the feedback part; and reconstructing the digital transmission signal according to the result of the adding step.

Other features and advantages of the present invention will become apparent from the following description taken in conjunction with the accompanying drawings.

DETAILED DESCRIPTION OF THE PREFERRED EMBODIMENTS

Now, the preferred embodiments of the present invention will be described with reference to the drawings.

First, it is noted that, when the data are equalized as they are read out in a reversed time direction (from A to B in FIG. 4), if the transmitted signals had the transmission characteristic of the non-minimum phase mode shown in FIG. 5 which has a large delay spread, a relatively great number of feedforward taps are necessary in order to equalize this transmitted signal, whereas if the transmitted signals had the transmission characteristic of the minimum phase mode shown in FIG. 6 which has a small delay spread, a relatively fewer number of feedback taps suffice for the equalization of this transmitted signal.

Thus, the number of feedforward taps $n_a$ necessary for equalizing when the data are to be read in a normal time direction (from C to D in FIG. 4) is roughly equal to 25 to 75% of a total number of feedforward and feedback taps, while a number of feedback taps $n_b$ necessary for equalizing when the data are to be read in a normal time direction (from C to D in FIG. 4) is roughly equal to 75 to 25% of a total number of feedforward and feedback taps, and there is a relationship of $n_a < n_b$.

Similarly, a number of feedforward taps $n_c$ necessary for equalizing when the data are to be read in a reversed time direction (from A to B in FIG. 4) is roughly equal to 70 to 95% of a total number of feedforward and feedback taps, while a number of feedback taps $n_d$ necessary for equalizing when the data are to be read in a reversed time direction (from A toward B in FIG. 4) is roughly equal to 30 to 5% of a total number of feedforward and feedback taps, and there is a relationship of $n_c < n_d$.

According to the present invention, a number of feedforward taps and a number of feedback taps are controlled such that, when the data are to be read in a normal time direction (from C toward D in FIG. 4), a number of feedforward taps is set equal to $n_a$ while a number of feedback taps is set equal to $n_b$, and when the data are to be read in a reversed time direction (from A toward B in FIG. 4), a number of feedforward taps is set equal to $n_c$ while a number of feedback taps is set equal to $n_d$.

Moreover, by maintaining a total number of feedforward and feedback taps as a constant number in either case of reading in normal or reversed time direction, an amount of calculation associated with the equalization can be maintained at the same amount, so that the equalization can be performed efficiently. In particular, in a case the decision feedback equalizer is equipped with the tap coefficient determination unit using an algorithm which requires a huge amount of calculation, such as an RLS (recursive least square) algorithm, a number of variables involved in the tap coefficient determination algorithm can be held unchanged, so that there is no need to perform an additional tedious switching procedure. The fast convergence algorithm such as RLS algorithm is indispensable for a digital mobile communication, in which the speed of the communication path change is very large.

Figure 8:
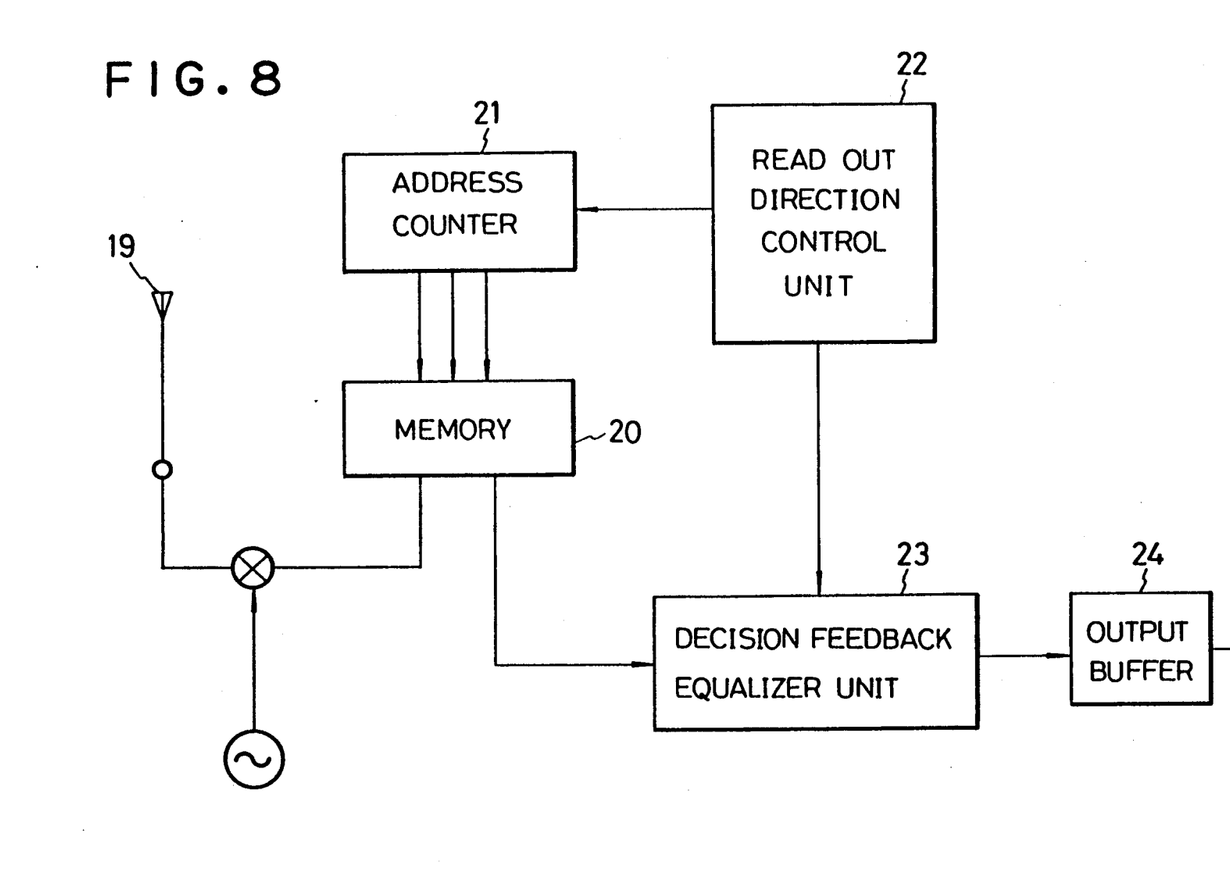
FIG. 8 is a block diagram of a signal receiver system incorporating one embodiment of a decision feedback equalizer according to the present invention.

Referring now to FIG. 8, one embodiment of a signal receiver system for the multipath digital communication using decision feedback equalizer of the present invention will be described.

This signal receiver system comprises a receiver antenna 19 for receiving bursty transmitted signal, a memory 20 for storing the received signal, an address counter 21 for specifying an address in the memory 20, a read out direction control unit 22 for controlling a direction (a normal time direction or a reversed time direction) in which the received signal is to be read out; a decision feedback equalizer unit 23, and an output buffer 24 for temporarily storing the output of the decision feedback equalizer 23.

The decision feedback equalizer unit 23 is capable of controlling a number of feedforward taps and a number of feedback taps such that, when the data are to be read in a normal time direction (from C toward D in FIG. 4), a number of feedforward taps is set equal to $n_a$ while a number of feedback taps is set equal to $n_b$, and when the data are to be read in a reversed time direction (from A toward B in FIG. 4), a number of feedforward taps is set equal to $n_c$ while a number of feedback taps is set equal to $n_d$.

Figure 9:
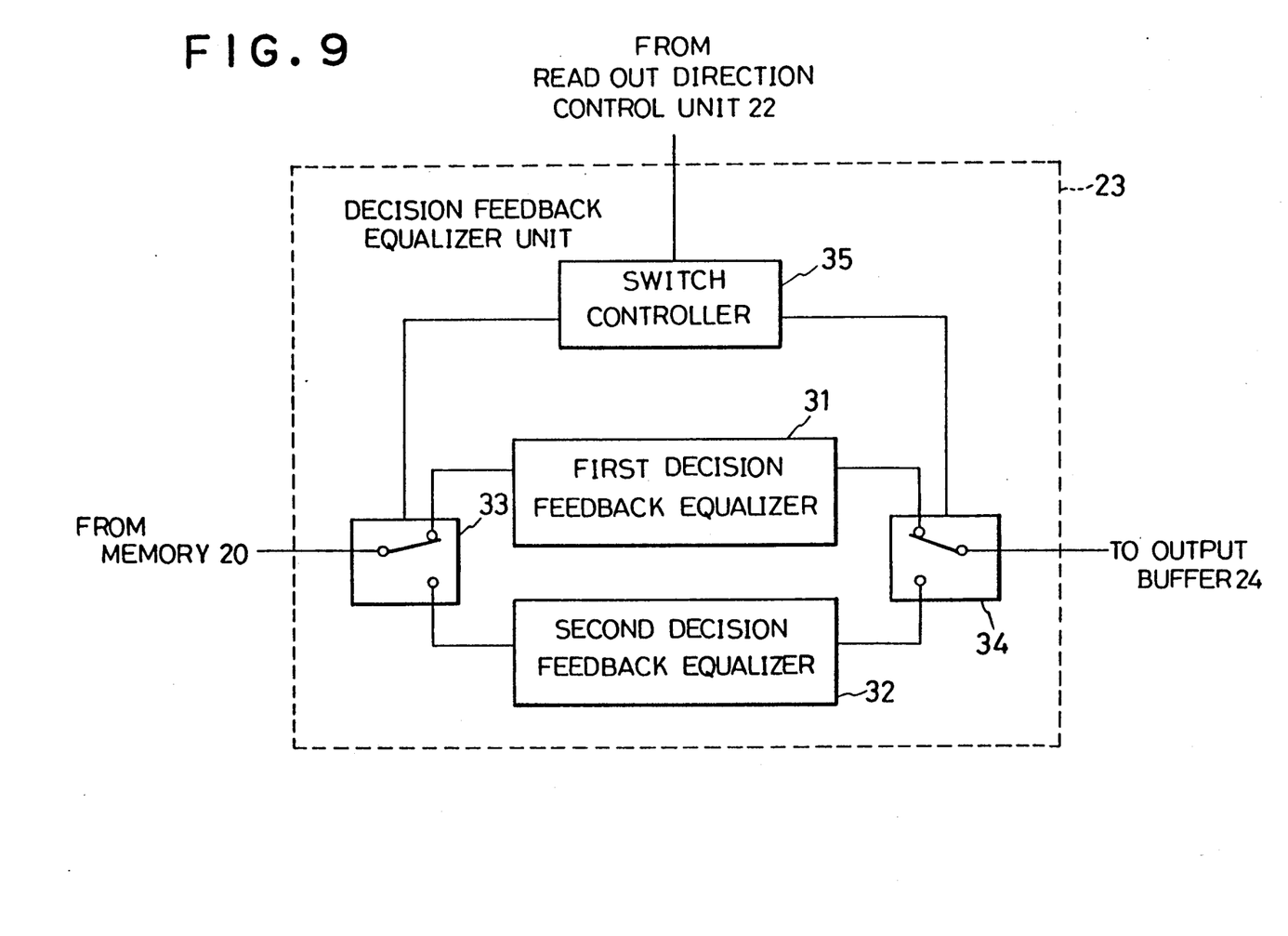
FIG. 9 is a block diagram of one embodiment of a decision feedback equalization unit in the signal receiver system of FIG. 8.

To achieve this function, this decision feedback equalizer unit 23 has a configuration shown in detail in FIG. 9.

In the configuration of FIG. 9, the decision feedback equalizer unit 23 further comprises a first decision feedback equalizer 31, a second decision feedback equalizer 32, an input switch 33, an output switch 34, and a switch controller 35. The switch controller 35 controls the input and output switches 33 and 34 according to the output of the read out direction control unit 22, so as to select an appropriate one of the first and second decision feedback equalizers 31 and 32.

Figure 10:
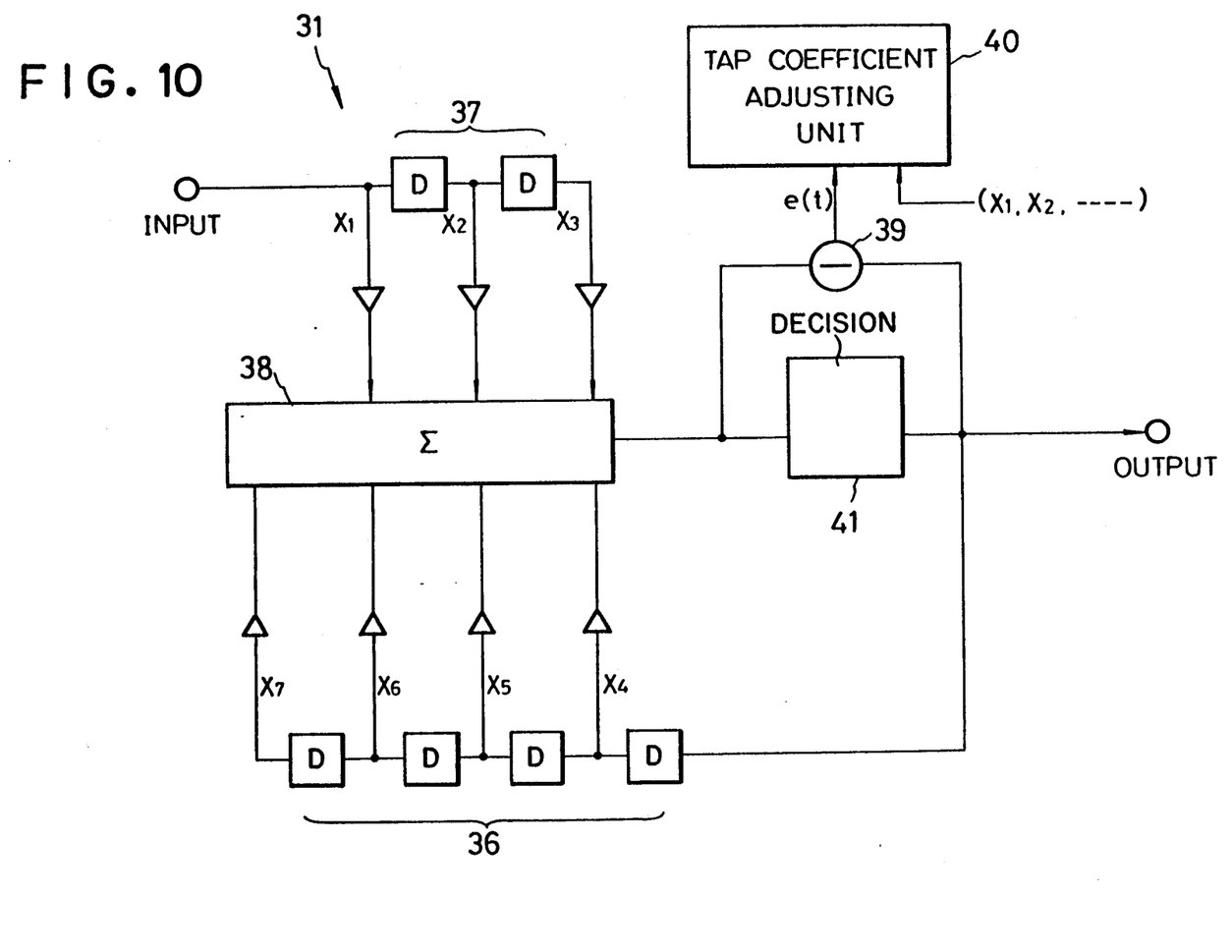
FIG. 10 is a block diagram of a first decision feedback equalizer in the decision feedback equalization unit of FIG. 9.

The first decision feedback equalizer 31 is for equalization in a case of reading the transmitted signal in a normal time direction (from C to D in FIG. 4), and has a configuration shown in FIG. 10.

Namely, this first decision feedback equalizer 31 comprises a greater number of feedback taps 36, a smaller number of feedforward taps 37, an adder 38, a subtractor 39, a tap coefficient adjusting unit 40, and a decision device 41. The feedforward taps 37 provide a forward part of the equalizer while the feedback taps 36 provide a feedback part of the equalizer, the signals from which are added together by the adder 38 to reconstruct the transmitted signal without the multipath distortion. The decision device 41 determines the binary balues of the transmitted signal, i.e., which poriton is 0 and which portion is 1 in the transmitted signal, according to the output of the adder 38. The output of the decision device 41 is fed back to the feedback taps 36. Meanwhile, the subtractor 39 subtracts the output of the adder 38 from the output of the decision device 41 to obtain a difference signal $e(t)$. The tap coefficient adjusting unit 40 receives the difference signal $e(t)$ as well as the input $(x_1, x_2, \ldots)$ of each of the feedforward taps 37 and the feedback taps 36, so as to assess the appropriateness of tap coefficients given to the feedforward taps 37 and the feedback taps 36, and adjusts the tap coefficients to the values which reduce the difference signal $e(t)$.

Figure 11:
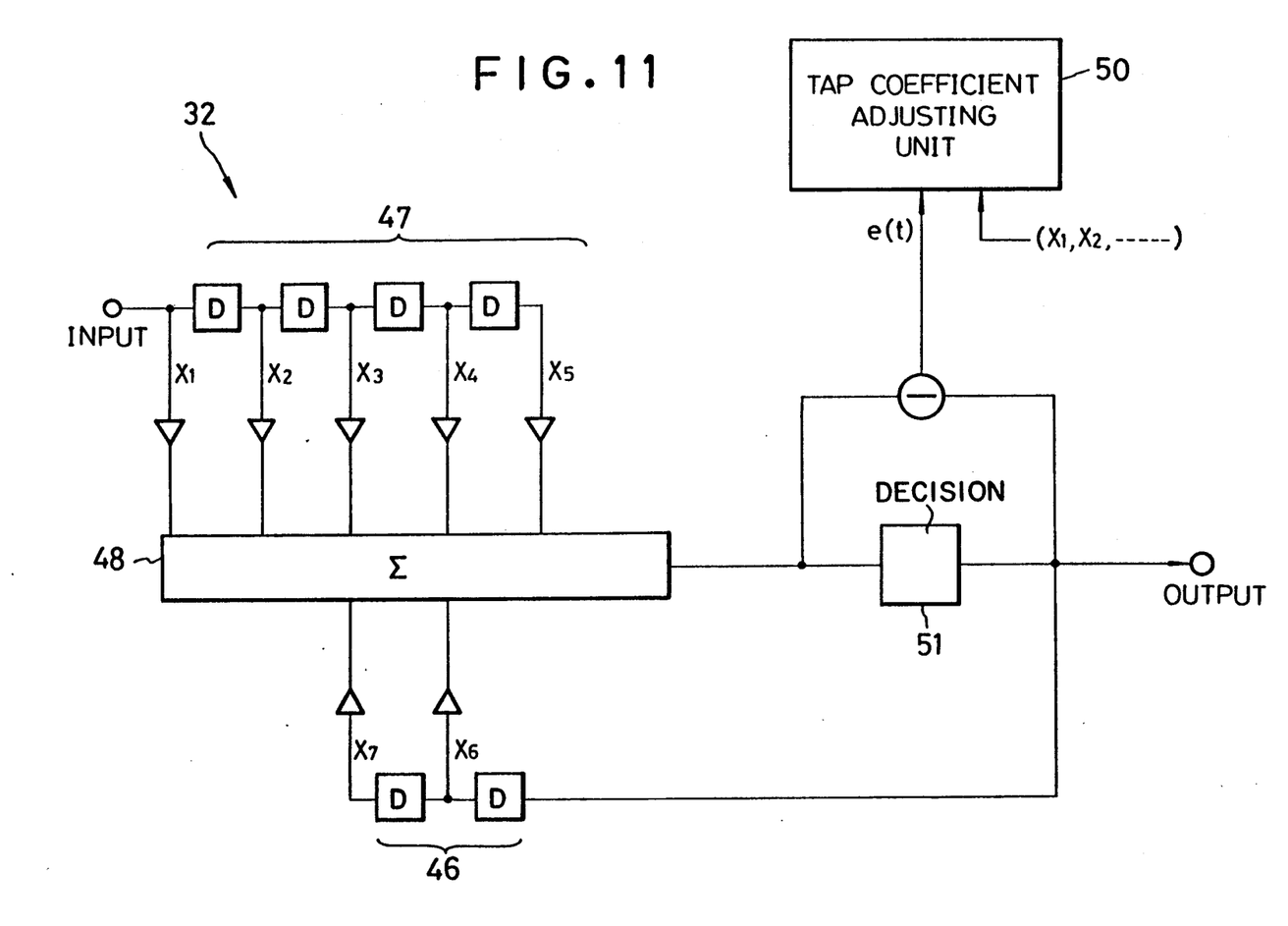
FIG. 11 is a block diagram of a second decision feedback equalizer in the decision feedback equalization unit of FIG. 9.

On the other hand, the second decision feedback equalizer 32 is for equalization in the case of reading the transmitted signal in a reversed time direction (from A to B in FIG. 4), and has a configuration shown in FIG. 11.

Namely, this second decision feedback equalizer 32 comprises a smaller number of feedback taps 46, a greater number of feedforward taps 47, an adder 48, a subtractor 49, a tap coefficient adjusting unit 50, and a decision device 51. The feedforward taps 47 provide a feed forward part of the equalizer while the feedback taps 46 provide a feedback part of the equalizer, which are added together by the adder 48 to reconstruct the transmitted signal without multipath distortion. The decision device 51 determines the binary values of the transmitted signal, i.e., which portion is 0 and which portion is 1 in the transmitted signal, according to the output of the adder 48. The output of the decision device 51 is fed back to the feedback taps 46. Meanwhile, the subtractor 49 subtracts the output of the adder 48 from the output of the decision device 51 to obtain a difference signal $e(t)$. The tap coefficient adjusting unit 50 receives the difference signal $e(t)$ as well as the input $(x_1, x_2, \ldots)$ of each of the feedforward taps 47 and the feedback taps 46, so as to assess the appropriateness of tap coefficients given to the feedforward taps 47 and the feedback taps 46, and adjusts the tap coefficients to the values which reduce the difference signal $e(t)$.

A total number of the feedforward taps and the feedback taps is the same in both the first and the second decision feedback equalizers 31 and 32.

Figure 12:
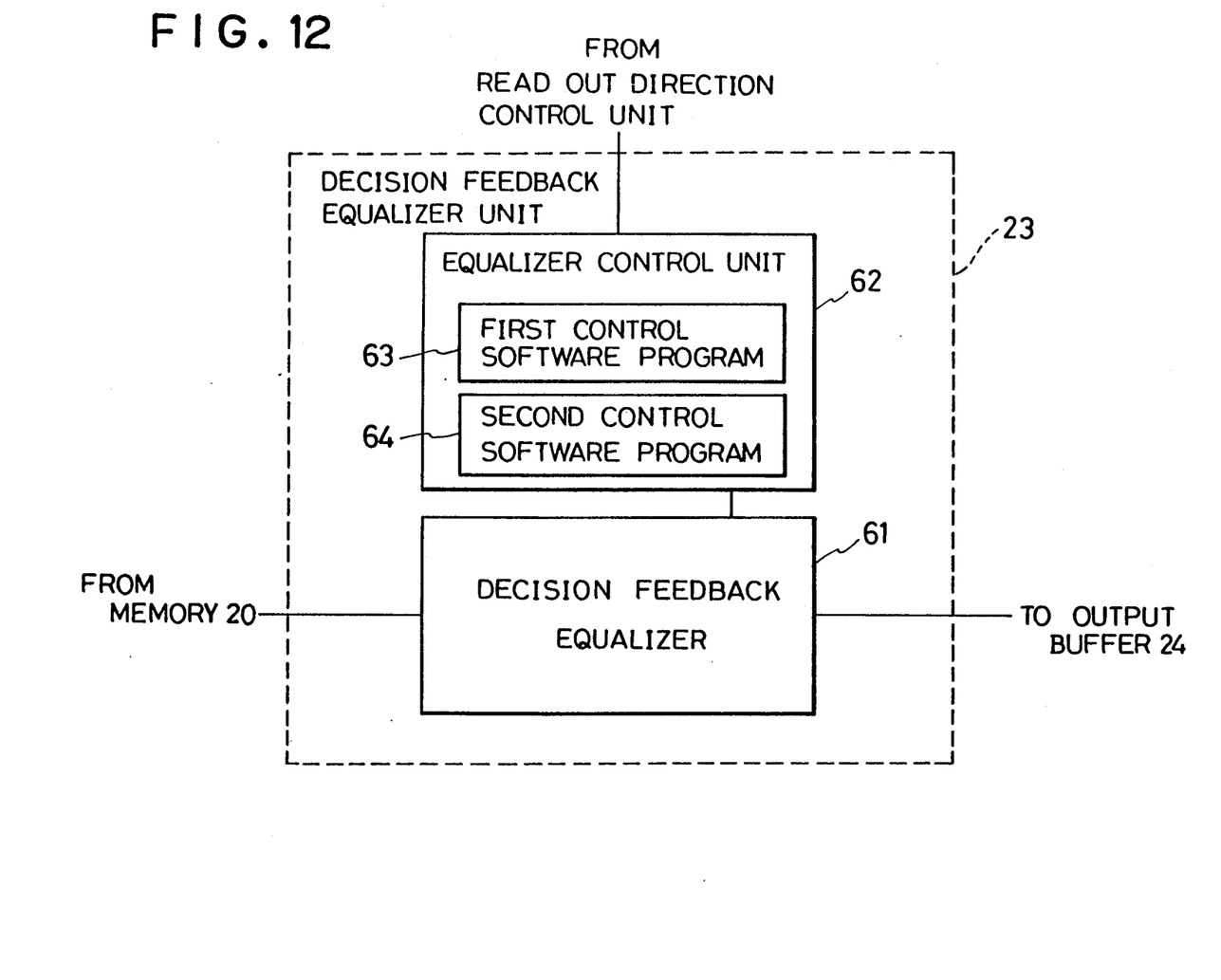
FIG. 12 is a block diagram of another embodiment of a decision feedback equalization unit in the signal receiver system of FIG. 8.

Alternatively, the decision feedback equalizer unit 23 may have a configuration shown in detail in FIG. 12.

In the configuration of FIG. 12, the decision feedback equalizer unit 23 further comprises a decision feedback equalizer 61, and an equalizer control unit 62.

The equalizer control unit 62 controls the decision feedback equalizer 61 by using a first control software program 63 for operating the decision feedback equalizer 61 in a manner appropriate for a case of reading the transmitted signal in a normal time direction (from C to D in FIG. 4), and a second control software program 64 for operating the decision feedback equalizer 61 in a manner appropriate for a case of reading the transmitted signal in a reversed time direction (from A to B in FIG. 4), where an appropriate one of the first and the second control software programs is selected according to the output of the read out direction control unit 22.

Figure 13:
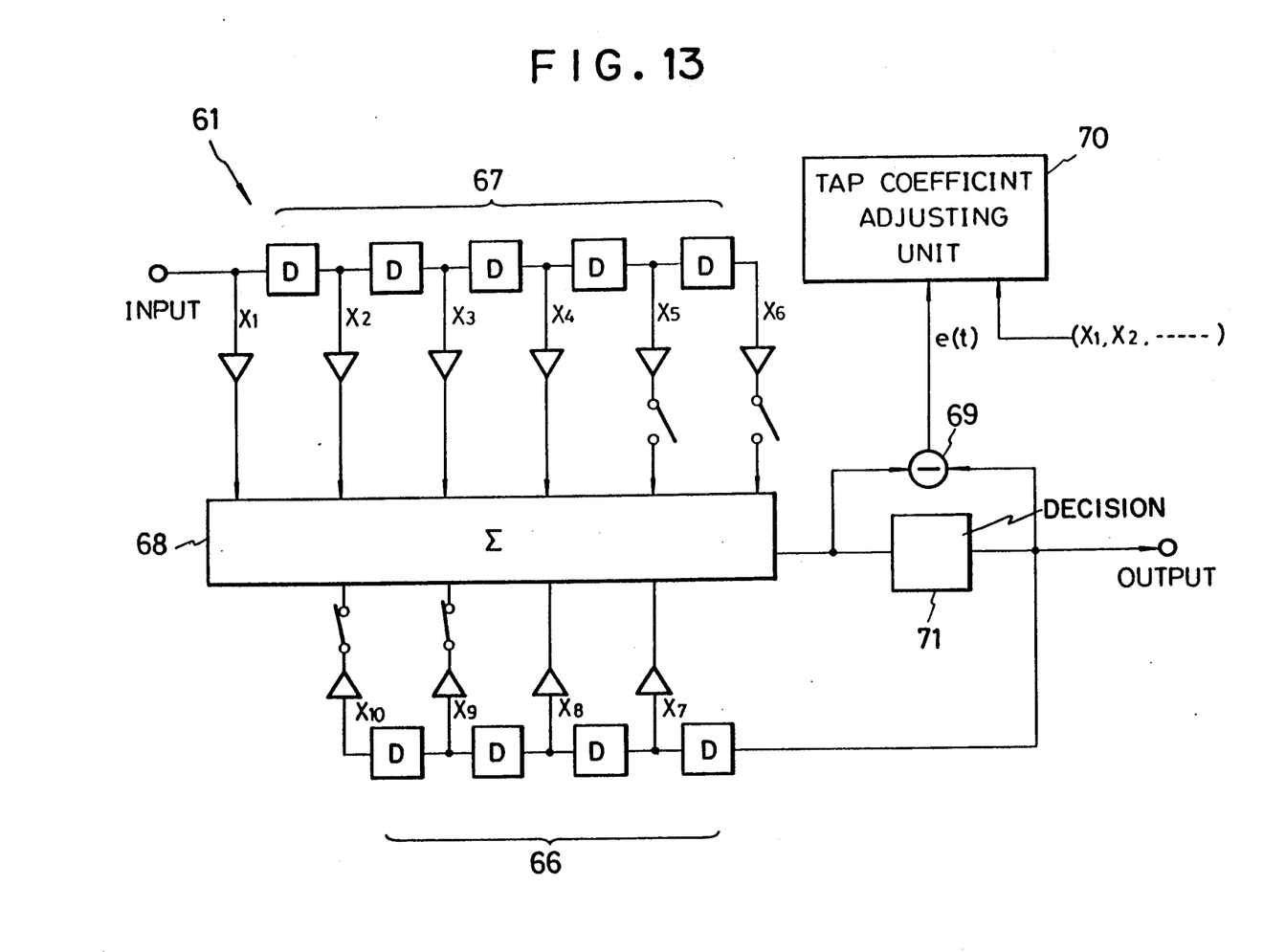
FIG. 13 is a block diagram of a decision feedback equalizer in the decision feedback equalization unit of FIG. 12.

The decision feedback equalizer 61 has the configuration shown in FIG. 13, and comprises a variable number of feedback taps 66, a variable number of feedforward taps 67, an adder 68, a subtractor 69, a tap coefficient adjusting unit 70, and a decision device 71.

The feedforward taps 67 provide a feedforward part of the equalizer, while the feedback taps 66 provide a feedback part of the equalizer, which are added together by the adder 68 to reconstruct the transmitted signal without the multipath distortion.

When the first control software program 63 of the equalizer control unit 62 is operating the decision feedback equalizer 61, a number of feedforward taps 67 is set equal to $n_a$ while a number of feedback taps 66 is set equal to $n_b$, whereas when the second control software program 64 of the equalizer control unit 62 is operating the decision feedback equalizer 61, a number of feedforward taps is set equal to $n_c$ while a number of feedback taps is set equal to $n_d$. This is achieved by controlling a number of connections and a number of disconnections for the feedforward taps 67 and the feedback taps 66 appropriately.

The decision devcie 71 determines the binary values of the transmitted signal, i.e., which portion is 0 and which portion is 1 in the transmitted signal, according to the output of the adder 68. The output of the decision device 71 is fed back to the feedback taps 66.

Meanwhile, the subtractor 69 subtracts the output of the adder 68 from the ouput of the decision device 71 to obtain a difference signal e(t). The tap coefficient adjusting unit 70 receives the difference signal e(t) as well as the input $(x_1, x_2, ...)$ of each of the feedforward taps 67 and the feedback taps 66, so as to assess the appropriateness of tap coefficients given to the feedforward taps 67 and the feedback taps 66, and adjusts the tap coefficients to the values which reduce the difference signal e(t).

In this decision feedback equalizer 61, the total number of the connected feedforward taps and the connected feedback taps is maintained as a constant number, for either case of using the first control software programs 63 or of using the second control software program 64.

Thus, according to the present invention, the time reversal for the transmission characteristic arising in a course of equalization can be dealt with, without a considerable increase in the number of taps used and the resulting reduction of the response speed, by adjusting a number of feedforward taps and a number of feedback taps appropriately, according to a direction in which the signal data are to be read out.

Moreover, by maintaining the total number of feedforward and feedback taps as a constant number in either case of reading in normal or reversed time direction, the amount of calculation associated with the equalization can be maintained at the same amount, so that the equalization can be performed efficiently.

It is to be noted that the present invention is equally applicable to other types of communication such as communications using a multiple access communication technique called BTMA (busy tone multiple access), or CSMA (carrier sense multiple access), rather than TDMA used in the above description, or to the transmission of the bursty transmission signal rather than the reception of such a signal as described above.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for decision feedback equalization of a digital transmission signal, comprising:

a plurality of feeforward taps for providing a feedforward part, at least one feedforward tap of said feedforward taps being capable of being selectively activated;

a plurality of feedback taps for providing a feedback part, at least ne feedback tap of said feedback taps being selectively activated;

means for controlling a number of activated feedforward taps and a number of activated feedback taps according to whether said transmission signal is to be read in a normal time direction or in a reversed time direction;

an adder for adding said feedforward part and said feedback part; and a decision device for reconstructing said digital transmission signal according to an output of said adder.

2. The apparatus of claim 1, wherein said means for controlling controls said number of activated feedforward taps and said number of activated feedback taps such that said number of activated feedback taps is made greater than said number of activated feedforward taps when said transmission signal is to be read in said normal time direction, and said number of activated feedforward taps is made greater than said number of activated feedback taps when said transmission signal is to be read in said reversed time direction.

3. The apparatus of claim 1, wherein said means for controlling controls said number of activated feedforward taps and said number of activated feedback taps such that said number of activated feedforward taps is made greater for a case of reading said transmission signal in said reversed time direction than for a case of reading said transmission signal in said normal time direction, and said number of activated feedback taps is made greater for a case of reading said transmission signal in said normal time direction than for a case of reading said transmission signal in said reversed time direction.

4. The apparatus of claim 1, wherein a total number of said activated feedforward taps and said activated feedback taps is a constant number.

5. The apparatus of claim 1, wherein a number of said activated feedforward taps is changed by switching between a first set of said feedforward taps and a second set of said feedforward taps which has a greater number of said feedforward taps than said first set, and a number of said activated feedback taps is changed by switching between a first set of said feedback taps and a second set of said feedback taps which has a greater number of said feedback taps than said first set.

6. The apparatus of claim 1, wherein said at least one feedforward tap of said feedforward taps is made capable of being selectively activated by making each said at least one feedforward tap freely disconnectable, and said at least one feedback tap of said feedback taps is made capable of being selectively activated by making each said at least one feedback tap freely disconnectable, and said means for controlling controls a number of said activated feedforward taps by changing a number of disconnected feedforward taps and a number of activated feedback taps by changing a number of disconnected feedback taps.

7. The apparatus of claim 1, further comprising means for adjusting tap coefficients of said feedforward taps and said feedback taps according to a difference between said output of said adder and said digital transmission signal reconstructed by said decision device.

8. A method for decision feedback equalization of a digital transmission signal, comprising the steps of:
providing a plurality of feedforward taps which provide a feedforward part, at least one feedforward tap of said feedforward taps being capable of being selectively activated;
providing a plurality of feedback taps which provide a feedback part, at least one feedback tap of said feedback taps being capable of being selectively activated;
controlling number of activated feedforward taps and a number of activated feedback taps, according to whether said transmission signal is to be read in a normal time direction or in a reversed time direction;
adding said feedforward part and said feedback part; and
reconstructing said digital transmission signal according to a result of said adding step.

9. The method of claim 8, wherein in said controlling step, said number of activated feedforward taps and said number of activated feedback taps are controlled such that said number of activated feedback taps is made greater than said number of activated feedforward taps when said transmission signal is to be read in said normal time direction, and said number of activated feedforward taps is made greater than said number of activated feedback taps when said transmission signal is to be read in said reversed time direction.

10. The method of claim 8, wherein in said controlling step, said number of activated feedforward taps and said number of activated feedback taps are controlled such that said number of activated feedforward taps is made greater for a case of reading said transmission signal in said reversed time direction than for a case of reading said transmission signal in said normal time direction, and said number of activated feedback taps is made greater for a case of reading said transmission signal in said normal time direction than for a case of reading said transmission signal in said reversed time direction.

11. The method of claim 8, wherein a total number of said activated feedforward taps and said activated feedback taps is a constant number.

12. The method of claim 8, wherein said number of said activated feedforward taps is changed by switching between a first set of said feedforward taps and a second set of said feedforward taps which has a great number of said feedforward taps than said first set and said number of said activated feedback taps is changed by switching betwen a first set of said feedback taps and a second set of said feedback taps which has a greater number of said feedback taps than said first set.

13. The method of claim 8, wherein said at least one feed forward tap of said feedforward taps is made capable of being selectively activated by making each said at least one feedforward tap freely disconnectable, and said at least one feedback tap of said feedback taps is made capable of being selectively activated by making each said at least one feedback tap freely disconnectable, and wherein in said controlling step said number of said activated feedforward taps is controlled by changing said number of said disconnected feedforward taps and said number of said activated feedback taps is controlled by changing said number of said disconnected feedback taps.

14. The method of claim 8, further comprising the step of adjusting tap coefficients of said feedforward taps and said feedback taps according to a difference between said result of said adding step and said digital transmission signal reconstructed in said reconstructing step.

* * * * *